(12) United States Patent
Kwon et al.

(10) Patent No.: US 9,856,953 B1
(45) Date of Patent: Jan. 2, 2018

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,400

(22) Filed: Dec. 6, 2016

(30) Foreign Application Priority Data

Sep. 12, 2016 (KR) .................. 10-2016-0117355

(51) Int. Cl.
*F16H 3/66* (2006.01)
*F16H 3/62* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC .............. F16H 3/66; F16H 2200/0069; F16H 2200/2012; F16H 2200/2046
See application file for complete search history.

(56) References Cited

U.S. PATENT DOCUMENTS

| 7,704,181 | B2 * | 4/2010 | Phillips | F16H 3/66 475/275 |
| 7,909,726 | B2 * | 3/2011 | Phillips | F16H 3/66 475/282 |
| 7,993,238 | B2 * | 8/2011 | Phillips | F16H 3/66 475/282 |
| 8,070,646 | B2 * | 12/2011 | Hart | F16H 3/66 475/280 |
| 8,328,678 | B2 * | 12/2012 | Seo | F16H 3/666 475/271 |
| 9,133,915 | B2 * | 9/2015 | Mellet | F16H 3/62 |
| 9,151,363 | B2 * | 10/2015 | Fellmann | F16H 3/66 |
| 9,464,693 | B2 * | 10/2016 | Beck | F16H 3/66 |
| 9,518,638 | B2 * | 12/2016 | Muller | F16H 3/66 |
| 9,625,008 | B2 * | 4/2017 | Cho | F16H 3/66 |

(Continued)

*Primary Examiner* — Jacob S Scott
*Assistant Examiner* — Tinh Dang
(74) *Attorney, Agent, or Firm* — Brinks Gilson & Lione

(57) ABSTRACT

The present disclosure provides a planetary gear train of an automatic transmission for a vehicle having advantages of improving power transfer performance and fuel efficiency by implementing ten forward speeds and one reverse speed. The planetary gear train includes: first, second, third, and fourth planetary gear sets; an input shaft; an output shaft; eight shafts connected to the respective rotation elements of the first, second, third, and fourth planetary gear sets; four clutches and two brakes which are control elements; and a transmission housing H. With this arrangement, rotation power from an engine which is input from the input shaft is shifted by a mutual complementing operation between the first, second, third, and fourth planetary gear sets, and is then output through the output shaft.

10 Claims, 2 Drawing Sheets

(56) References Cited

U.S. PATENT DOCUMENTS

Figure 1:
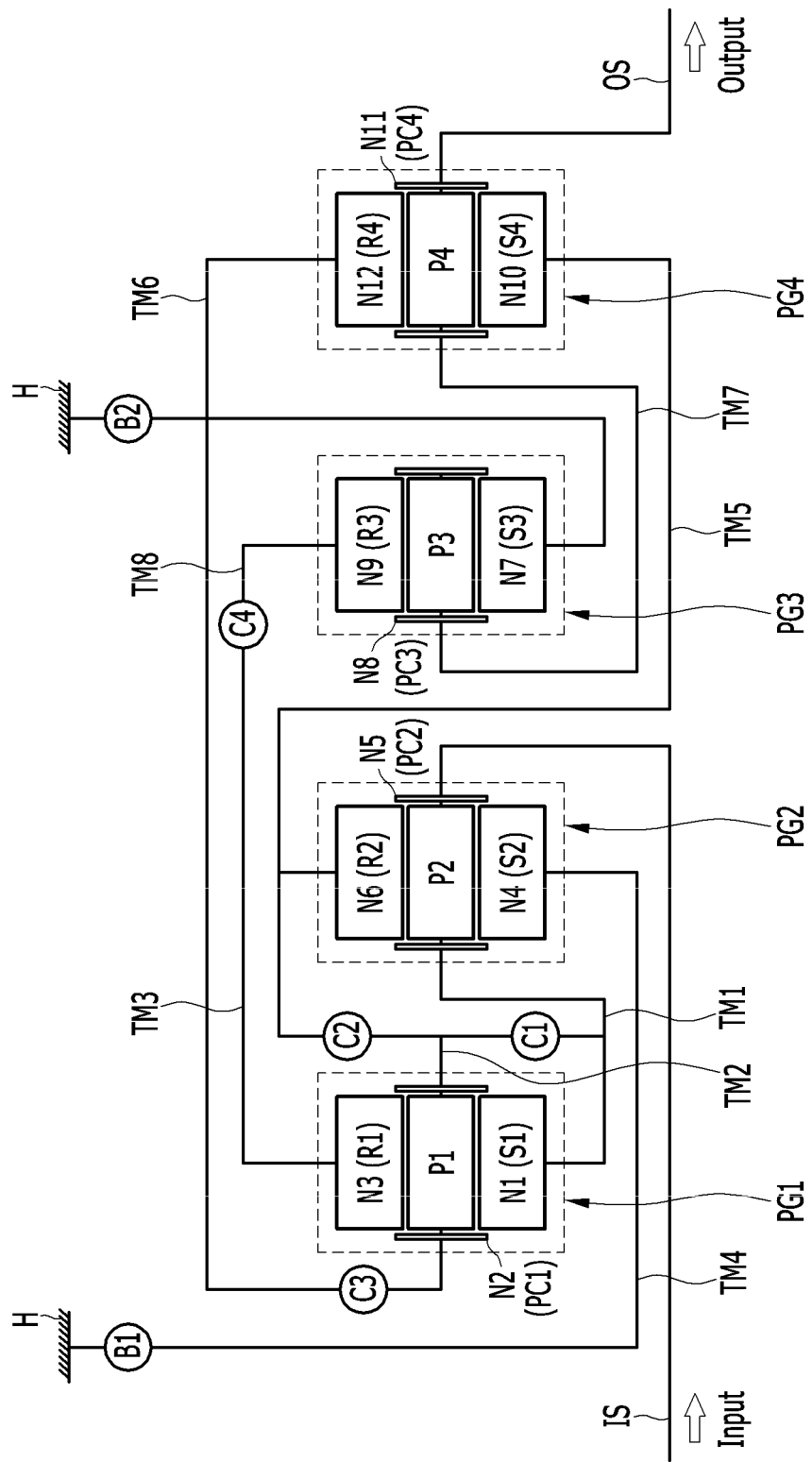

| | | | | |
|---|---|---|---|---|
| 9,689,467 B2* | 6/2017 | Foster | ............... | F16H 3/666 |
| 9,726,256 B2* | 8/2017 | Muller | ............... | F16H 3/66 |
| 9,726,257 B2* | 8/2017 | Lee | ............... | F16H 3/66 |
| 9,777,803 B2* | 10/2017 | Kwon | ............... | F16H 3/66 |

* cited by examiner

FIG. 2

| Speed Stage | Control element | | | | | | Gear Ratio |
|---|---|---|---|---|---|---|---|
| | C1 | C2 | C3 | C4 | B1 | B2 | |
| D1 | | ● | | ● | | | 5.667 |
| D2 | ● | ● | | | | ● | 3.200 |
| D3 | ● | | | | ● | ● | 2.057 |
| D4 | ● | | | ● | | ● | 1.556 |
| D5 | ● | | ● | ● | | ● | 1.231 |
| D6 | ● | | ● | ● | | | 1.000 |
| D7 | ● | | ● | ● | | | 0.852 |
| D8 | | | ● | ● | ● | | 0.749 |
| D9 | | ● | | | ● | | 0.643 |
| D10 | | ● | | ● | ● | | 0.488 |
| REV | | | ● | ● | | ● | -2.333 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0117355, filed on Sep. 12, 2016, the entire contents of which are incorporated herein by reference.

FIELD

The present disclosure relates to an automatic transmission for a vehicle that can improve power delivery performance and reduce fuel consumption.

BACKGROUND

The statements in this section merely provide background information related to the present disclosure and may not constitute prior art.

In the field of an automatic transmission, more multiple shift-stages are used to enhance fuel efficiency and drivability of a vehicle. Recently increased oil price leads to a more competition in enhancing fuel efficiency of a vehicle.

In this sense, research for the engine-downsizing has been conducted to reduce weight while enhancing fuel efficiency. Similarly, research on an automatic transmission has been performed to simultaneously provide better drivability and fuel efficiency through more shift stages with reduced the number of parts.

In order to achieve more shift stages for an automatic transmission, the number of parts, especially the number of planetary gear sets, is typically increased, which may deteriorate installability, production cost, weight and/or power flow efficiency.

An automatic transmission of eight or more shift-stages typically includes three to four planetary gear sets and five to seven control elements (frictional elements), and thus may be easily lengthy transmission, thereby undermining installability.

We have discovered that disposing planetary gear sets in parallel or employing dog clutches instead of wet-type control elements is sometimes attempted. However, such an arrangement may not be widely applicable, and using dog clutches may easily deteriorate shift-feel.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle, which improves power delivery performance and fuel efficiency by providing ten forward speed stages and one reverse speed stage using a driving point positioned at a low engine speed.

A planetary gear train of an automatic transmission for a vehicle in one exemplary form of the present disclosure may include: an input shaft configured to receive torque from an engine; an output shaft configured to output a changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connected to the first rotation element, the fifth rotation element, and the input shaft; a second shaft connected to the second rotation element, and configured to selectively connected to the first shaft; a third shaft connected to the third rotation element; a fourth shaft connected to the fourth rotation element; a fifth shaft connected to the sixth rotation element and the tenth rotation element, and configured to selectively connected to the second shaft; a sixth shaft connected to the seventh rotation element and the twelfth rotation element, and configured to be selectively connected to the second shaft; a seventh shaft connected to the eighth rotation element, the eleventh rotation element, and the output shaft; and an eighth shaft connected to the ninth rotation element, and configured to be selectively connected to the third shaft.

The fourth shaft and the sixth shaft may be selectively connected to a transmission housing, respectively.

The first, second, and third rotation elements of the first planetary gear set may be respectively a first sun gear, a first planet carrier, and a first ring gear of the first planetary gear set, and the fourth, fifth, and sixth rotation elements of the second planetary gear set may be respectively a second sun gear, a second planet carrier, and a second ring gear of the second planetary gear set. The seventh, eighth, and ninth rotation elements of the third planetary gear set may be respectively a third sun gear, a third planet carrier, and a third ring gear of the third planetary gear set, and the tenth, eleventh, and twelfth rotation elements of the fourth planetary gear set may be respectively a fourth sun gear, a fourth planet carrier, and a fourth ring gear of the fourth planetary gear set.

The first, second, third, and fourth planetary gear sets may be disposed in a sequence of the first, second, third, and fourth planetary gear sets from an engine side.

The planetary gear train may further include: a first clutch configured to selectively connect the first shaft and the second shaft; a second clutch configured to selectively connect the second shaft and the fifth shaft; a third clutch configured to selectively connect the second shaft and the sixth shaft; a fourth clutch configured to selectively connect the third shaft and the eighth shaft; a first brake configured to selectively connect the fourth shaft and the transmission housing; and a second brake configured to selectively connect the sixth shaft and the transmission housing.

The planetary gear train according to the exemplary form of the present disclosure may achieve ten forward speed stages and one reverse speed stage by combining four planetary gear sets with six control elements. The four planetary gear sets may be in the form of a simple planetary gear set.

In addition, the planetary gear train in the exemplary form of the present disclosure may achieve speed stages suitable to a rotational speed of the engine due to multiple-speed stages of the automatic transmission. Particularly, silent driving of the vehicle may be improved by using operation point positioned at a low rotational speed region of an engine.

In addition, the planetary gear train may increase driving efficiency of the engine and may improve power delivery performance and fuel efficiency.

Other effects obtainable or predictable from the exemplary forms of the present disclosure will be explicitly or implicitly described in a DETAILED DESCRIPTION section. That is, various effects predictable from the exemplary forms of the present disclosure will be described in the DETAILED DESCRIPTION section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train in one exemplary form of the present disclosure; and FIG. 2 is an operational chart for respective control elements at respective shift stages in a planetary gear train in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an exemplary form of the present disclosure will be described in detail with reference to drawings.

However, parts which are not related with the description are omitted for clearly describing the exemplary forms of the present disclosure.

In the following description, dividing names of components into first, second, and the like is to divide the names because the names of the components are the same as each other and an order thereof is not particularly limited.

FIG. 1 is a schematic diagram of a planetary gear train in one exemplary form of the present disclosure.

Referring to FIG. 1, a planetary gear train includes: first, second, third, and four planetary gear sets PG1, PG2, PG3, and PG4 arranged on a same axis; an input shaft IS; an output shaft OS; eight shafts TM1 to TM8 interconnecting rotation elements of the first, second, third, and four planetary gear sets (i.e., PG1, PG2, PG3, and PG4); four clutches (i.e., C1, C2, C3 and C4) and two brakes (i.e., B1 and B2) as control elements; and a transmission housing H.

Torque input from the input shaft IS is shifted by cooperative operation of the first, second, third, and fourth planetary gear sets (i.e., PG1, PG2, PG3, and PG4), and then the shifted torque is output through the output shaft OS.

The planetary gear sets are arranged in the order of first, second, third, and fourth planetary gear sets PG1, PG2, PG3, and PG4, from an engine side.

The input shaft IS is an input member. The torque from a crankshaft of an engine is converted through a torque converter and then delivered to the input shaft IS.

The output shaft OS is an output member, is disposed in parallel with the input shaft IS, and transmits driving torque to a driving wheel through a differential apparatus.

In one form, the first planetary gear set PG1 may be a single pinion planetary gear set and include: a first sun gear S1, a first planet carrier PC1 rotatably supporting a first pinion P1 that is externally meshed with the first sun gear S1; and a first ring gear R1 that is internally meshed with the first pinion P1. The first sun gear, the first planet carrier, and the first ring gear correspond to first, second, and third rotation elements (i.e., N1, N2, and N3), respectively.

The second planetary gear set PG2 may be a single pinion planetary gear set and include: a second sun gear S2; a second planet carrier PC2 rotatably supporting a second pinion P2 that is externally meshed with the second sun gear S2; and a second ring gear R2 that is internally meshed with the second pinion P2. The second sun gear, the second planet carrier, and the second ring gear correspond to fourth, fifth, and sixth rotation elements (i.e., N4, N5, and N6), respectively.

The third planetary gear set PG3 may be a single pinion planetary gear set and include: a third sun gear S3, a third planet carrier PC3 rotatably supporting a third pinion P3 that is externally meshed with the third sun gear S3, and a third ring gear R3 that is internally meshed with the third pinion P3. The third sun gear, the third planet carrier, and the third ring gear correspond to seventh, eighth, and ninth rotation elements (i.e., N7, N8, and N9), respectively.

The fourth planetary gear set PG4 may be a single pinion planetary gear set and include: a fourth sun gear S4; a fourth planet carrier PC4 rotatably supporting a fourth pinion P4 that is externally meshed with the fourth sun gear S4; and a fourth ring gear R4 that is internally meshed with the fourth pinion P4. The fourth sun gear, the fourth planet carrier, and the fourth ring gear correspond to tenth, eleventh, and twelfth rotation elements (i.e., N10, N11, and N12), respectively.

Referring to FIG. 1, the first rotation element N1 is directly connected to the fifth rotation element N5, the sixth rotation element N6 is directly connected to the tenth rotation element N10, the seventh rotation element N7 is directly connected to the twelfth rotation element N12, and the eighth rotation element N8 is directly connected to the eleventh rotation element N11 such that the first, the second, the third, and the fourth planetary gear sets PG1, PG2, PG3, and PG4 are operated through eight shafts TM1 to TM8.

The eight shafts TM1 to TM8 will be described in further detail.

The eight shafts TM1 to TM8 may be rotation members that directly connect rotation elements to each other among the rotation elements of the planetary gear sets PG1, PG2, PG3, and PG4 or that are directly connected to any one rotation element of the planetary gear sets PG1, PG2, PG3, and PG4 and rotate with the rotation element to transmit torque. The eight shafts TM1 to TM8 may be fixed members that selectively or directly connect any one rotation element of the planetary gear sets PG1, PG2, PG3, and PG4 to the transmission housing H to fix the rotation element.

The first shaft TM1 is directly connected to the first rotation element N1 (first sun gear S1) and the fifth rotation element N5 (second planet carrier PC2), and is directly connected to the input shaft IS to be continuously operated as an input element.

The second shaft TM2 is directly connected to the second rotation element N2 (first planet carrier PC1) and is selectively connected to the first shaft TM1.

The third shaft TM3 is directly connected to the third rotation element N3 (first ring gear R1).

The fourth shaft TM4 is directly connected to the fourth rotation element N4 (second sun gear S2) and is selectively connected to the transmission housing H to be operated as a selective fixed element.

The fifth shaft TM5 is directly connected to the sixth rotation element N6 (second ring gear R2) and the tenth rotation element N10 (fourth sun gear S4), and is selectively connected to the second shaft TM2.

The sixth shaft TM6 is directly connected to the seventh rotation element N7 (third sun gear S3) and the twelfth rotation element N12 (fourth ring gear R4), and is selectively connected to the second shaft TM2 and the transmission housing H to be operated as a selective fixed element.

The seventh shaft TM7 is directly connected to the eighth rotation element N8 (third planet carrier PC3), the eleventh rotation element N11 (fourth planet carrier PC4), and the output shaft OS.

The eighth shaft TM8 is directly connected to the ninth rotation element N9 (third ring gear R3) and is selectively connected to the third shaft TM3.

In addition, four clutches C1, C2, C3 and C4 are disposed at portions at which any two shafts among the eight shafts TM1 to TM8 including the input shaft IS and the output shaft OS are selectively connected to each other.

In addition, two brakes B1 and B2 are disposed at portions at which any one shaft among the eight shafts TM1 to TM8 is selectively connected to the transmission housing H.

Arrangements of the four clutches C1 to C4 and the two brakes B1 and B2 are described in detail.

The first clutch C1 is disposed between the first shaft TM1 and the second shaft TM2, and selectively connects the first shaft TM1 and the second shaft TM2.

The second clutch C2 is disposed between the second shaft TM2 and the fifth shaft TM5, and selectively connects the second shaft TM2 and the fifth shaft TM5.

The third clutch C3 is disposed between the second shaft TM2 and the sixth shaft TM6, and selectively connects the second shaft TM2 and the sixth shaft TM6.

The fourth clutch C4 is disposed between the third shaft TM3 and the eighth shaft TM8, and selectively connects the third shaft TM3 and the eighth shaft TM8.

The first brake B1 is disposed between the fourth shaft TM4 and the transmission housing H, and selectively connects the fourth shaft TM4 and the transmission housing H.

The second brake B2 is disposed between the sixth shaft TM6 and the transmission housing H, and selectively connects the sixth shaft TM6 and the transmission housing H.

The control elements including the first, the second, the third, and the fourth clutches C1, C2, C3, and C4 and the first and second brakes B1 and B2 may be frictionally engaging units that are operated by hydraulic pressure. Particularly, the control elements may be, but not limited to, multi-plates friction elements of wet type. However, the control elements may be engaging units that are operated by electrical signal, such as dog clutches, electric clutches, magnetic particle clutches, etc.

FIG. 2 is an operational chart for respective friction elements at respective shift-stages in a planetary gear train according to a first exemplary form of the present disclosure.

Referring to FIG. 2, three control elements among the six control elements (i.e., the first, second, third, and fourth clutches C1, C2, C3 and C4 and the first and second brakes B1 and B2) are operated at each speed stage in the planetary gear train. The exemplary form of the present disclosure can achieve one reverse speed stage and ten forward speed stages.

The second and fourth clutches C2 and C4 and the second brake B2 are simultaneously operated at a first forward speed stage D1.

In a state that the second shaft TM2 is connected to the fifth shaft TM5 by operation of the second clutch C2 and the third shaft TM3 is connected to the eighth shaft TM8 by operation of the fourth clutch C4, torque of the input shaft IS is input to the first shaft TM1.

In addition, the sixth shaft TM6 is operated as a fixed element by the operation of the second brake B2. Therefore, the torque of the input shaft IS is shifted into the first forward speed stage by cooperative operation of respective shafts, and the first forward speed stage is output through the output shaft OS connected to the seventh shaft TM7.

The first and second clutches C1 and C2 and the second brake B2 are simultaneously operated at a second forward speed stage D2.

In a state that the first shaft TM1 is connected to the second shaft TM2 by operation of the first clutch C1 and the second shaft TM2 is connected to the fifth shaft TM5 by operation of the second clutch C2, torque of the input shaft IS is input to the first shaft TM1.

In addition, the sixth shaft TM6 is operated as a fixed element by the operation of the second brake B2. Therefore, the torque of the input shaft IS is shifted into the second forward speed stage, and the second forward speed stage is output through the output shaft OS connected to the seventh shaft TM7.

The first clutch C1 and first and second brakes B1 and B2 are simultaneously operated at a third forward speed stage D3.

In a state that the first shaft TM1 is connected to the second shaft TM2 by operation of the first clutch C1, torque of the input shaft IS is input to the first shaft TM1.

In addition, the fourth shaft TM4 and the sixth shaft TM6 are operated as a fixed element by the operation of the first and second brakes B1 and B2. Therefore, the torque of the input shaft IS is shifted into the third forward speed stage by cooperative operation of respective shafts, and the third forward speed stage is output through the output shaft OS connected to the seventh shaft TM7.

The first and fourth clutches C1 and C4 and the second brake B2 are simultaneously operated at a fourth forward speed stage D4.

In a state that the first shaft TM1 is connected to the second shaft TM2 by operation of the first clutch C1 and the third shaft TM3 is connected to the eighth shaft TM8 by operation of the fourth clutch C4, torque of the input shaft IS is input to the first shaft TM1.

In addition, the sixth shaft TM6 is operated as a fixed element by the operation of the second brake B2. Therefore, the torque of the input shaft IS is shifted into the fourth forward speed stage, and the fourth forward speed stage is output through the output shaft OS connected to the seventh shaft TM7.

The first and fourth clutches C1 and C4 and the first brake B1 are simultaneously operated at a fifth forward speed stage D5.

In a state that the first shaft TM1 is connected to the second shaft TM2 by operation of the first clutch C1 and the third shaft TM3 is connected to the eighth shaft TM8 by operation of the fourth clutch C4, torque of the input shaft IS is input to the first shaft TM1.

In addition, the fourth shaft TM4 is operated as a fixed element by the operation of the first brake B1. Therefore, the torque of the input shaft IS is shifted into the fifth forward speed stage, and the fifth forward speed stage is output through the output shaft OS connected to the seventh shaft TM7.

The first, third, and fourth clutches C1, C3, and C4 are simultaneously operated at a sixth forward speed stage D6.

In a state that the first shaft TM1 is connected to the second shaft TM2 by operation of the first clutch C1, the second shaft TM2 is connected to the sixth shaft TM6 by operation of the third clutch C3, and the third shaft TM3 is connected to the eighth shaft TM8 by operation of the fourth clutch C4, torque of the input shaft IS is input to the first shaft TM1.

In this case, the first, the third, and the fourth planetary gear sets PG1, PG3, and PG4 become lock-up states. Therefore, the torque of the input shaft IS input to the first shaft TM1 is shifted into the sixth forward speed stage, and the sixth forward speed stage is output through the output shaft OS connected to the seventh shaft TM7. At the sixth forward speed stage, rotation speed which is the same as rotation speed of the input shaft IS is output through the output shaft OS.

The first and third clutches C1 and C3 and the first brake B1 are simultaneously operated at a seventh forward speed stage D7.

In a state that the first shaft TM1 is connected to the second shaft TM2 by operation of the first clutch C1 and the second shaft TM2 is connected to the sixth shaft TM6 by operation of the third clutch C3, torque of the input shaft IS is input to the first shaft TM1.

In addition, the fourth shaft TM4 is operated as a fixed element by the operation of the first brake B1. Therefore, the torque of the input shaft IS is shifted into the seventh forward speed stage, and the seventh forward speed stage is output through the output shaft OS connected to the seventh shaft TM7.

The third and fourth clutches C3 and C4 and the first brake B1 are simultaneously operated at an eighth forward speed stage D8.

In a state that the second shaft TM2 is connected to the sixth shaft TM6 by operation of the third clutch C3 and the third shaft TM3 is connected to the eighth shaft TM8 by operation of the fourth clutch C4, torque of the input shaft IS is input to the first shaft TM1.

In addition, the fourth shaft TM4 is operated as a fixed element by the operation of the first brake B1. Therefore, the torque of the input shaft IS is shifted into the eighth forward speed stage, and the eighth forward speed stage is output through the output shaft OS connected to the seventh shaft TM7.

The second and third clutches C2 and C3 and the first brake B1 are simultaneously operated at a ninth forward speed stage D9.

In a state that the second shaft TM2 is connected to the fifth shaft TM5 by operation of the second clutch C2 and the second shaft TM2 is connected to the sixth shaft TM6 by operation of the third clutch C3, torque of the input shaft IS is input to the first shaft TM1.

In addition, the fourth shaft TM4 is operated as a fixed element by the operation of the first brake B1. Therefore, the torque of the input shaft IS is shifted into the ninth forward speed stage, and the ninth forward speed stage is output through the output shaft OS connected to the seventh shaft TM7.

The second and fourth clutches C2 and C4 and the first brake B1 are simultaneously operated at a tenth forward speed stage D10.

In a state that the second shaft TM2 is connected to the fifth shaft TM5 by operation of the second clutch C2 and the third shaft TM3 is connected to the eighth shaft TM8 by operation of the fourth clutch C4, torque of the input shaft IS is input to the first shaft TM1.

In addition, the fourth shaft TM4 is operated as a fixed element by the operation of the first brake B1. Therefore, the torque of the input shaft IS is shifted into the tenth forward speed stage, and the tenth forward speed stage is output through the output shaft OS connected to the seventh shaft TM7.

The third and fourth clutches C3 and C4 and the second brake B2 are simultaneously operated at a reverse speed stage REV.

In a state that the second shaft TM2 is connected to the sixth shaft TM6 by operation of the third clutch C3 and the third shaft TM3 is connected to the eighth shaft TM8 by operation of the fourth clutch C4, torque of the input shaft IS is input to the first shaft TM1.

In addition, the sixth shaft TM6 is operated as a fixed element by the operation of the second brake B2. Therefore, the torque of the input shaft IS is shifted into the reverse speed stage, and the reverse speed stage is output through the output shaft OS connected to the seventh shaft TM7 as inverse rotation speed.

The planetary gear trains according to the exemplary form of the present disclosure may achieve at least ten forward speed stages and one reverse speed stage by combining four planetary gear sets PG1, PG2, PG3, and PG4 with the four clutches C1, C2, C3, and C4 and the two brakes B1 and B2.

In addition, the planetary gear train according to the exemplary form of the present disclosure may achieve suitable speed stages according to rotation speed of the engine. Particularly, silent driving of the vehicle may be improved by using operation point positioned at a low rotational speed region of the engine.

In addition, the planetary gear train may increase driving efficiency of the engine and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

What is claimed is:
1. A planetary gear train of an automatic transmission for a vehicle, the planetary gear train comprising:
   an input shaft configured to receive torque from an engine;
   an output shaft configured to output a changed torque;
   a first planetary gear set including first, second, and third rotation elements;
   a second planetary gear set including fourth, fifth, and sixth rotation elements;
   a third planetary gear set including seventh, eighth, and ninth rotation elements;

a fourth planetary gear set including tenth, eleventh, and twelfth rotation elements;

a first shaft connected to the first rotation element, the fifth rotation element, and the input shaft;

a second shaft connected to the second rotation element and configured to be selectively connected to the first shaft;

a third shaft connected to the third rotation element;

a fourth shaft connected to the fourth rotation element;

a fifth shaft connected to the sixth rotation element and the tenth rotation element, and configured to be selectively connected to the second shaft;

a sixth shaft connected to the seventh rotation element and the twelfth rotation element, and configured to be selectively connected to the second shaft;

a seventh shaft connected to the eighth rotation element, the eleventh rotation element, and the output shaft; and an eighth shaft connected to the ninth rotation element, and configured to be selectively connected to the third shaft.

2. The planetary gear train of claim 1, wherein the fourth shaft and the sixth shaft are configured to be selectively connected to a transmission housing, respectively.

3. The planetary gear train of claim 1, wherein the first, second, and third rotation elements of the first planetary gear set are respectively a first sun gear, a first planet carrier, and a first ring gear of the first planetary gear set, the fourth, fifth, and sixth rotation elements of the second planetary gear set are respectively a second sun gear, a second planet carrier, and a second ring gear of the second planetary gear set, the seventh, eighth, and ninth rotation elements of the third planetary gear set are respectively a third sun gear, a third planet carrier, and a third ring gear of the third planetary gear set, and the tenth, eleventh, and twelfth rotation elements of the fourth planetary gear set are respectively a fourth sun gear, a fourth planet carrier, and a fourth ring gear of the fourth planetary gear set.

4. The planetary gear train of claim 1, wherein the first, second, third, and fourth planetary gear sets are disposed in a sequence of the first, second, third, and fourth planetary gear sets from an engine side.

5. The planetary gear train of claim 2, further comprising:
a first clutch configured to selectively connect the first shaft and the second shaft;
a second clutch configured to selectively connect the second shaft and the fifth shaft;
a third clutch configured to selectively connect the second shaft and the sixth shaft;
a fourth clutch configured to selectively connect the third shaft and the eighth shaft;
a first brake configured to selectively connect the fourth shaft and the transmission housing; and
a second brake configured to selectively connect the sixth shaft and the transmission housing.

6. A planetary gear train of an automatic transmission for a vehicle, the planetary gear train comprising:
an input shaft configured to receive torque from an engine;
an output shaft configured to output a changed torque;

a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the input shaft is connected to the fifth rotation element,
the output shaft is connected to the eleventh rotation element,
the first rotation element is connected to the fifth rotation element,
the sixth rotation element is connected to the tenth rotation element,
the seventh rotation element is connected to the twelfth rotation element,
the eighth rotation element is connected to the eleventh rotation element,
the second rotation element is configured to be selectively connected to the first, sixth, and seventh rotation elements, respectively, and
the third rotation element is configured to be selectively connected to the ninth rotation element.

7. The planetary gear train of claim 6, wherein the fourth rotation element and the seventh rotation element are selectively connected to a transmission housing respectively.

8. The planetary gear train of claim 6, wherein
the first, second, and third rotation elements of the first planetary gear set are respectively a first sun gear, a first planet carrier, and a first ring gear of the first planetary gear set,
the fourth, fifth, and sixth rotation elements of the second planetary gear set are respectively a second sun gear, a second planet carrier, and a second ring gear of the second planetary gear set,
the seventh, eighth, and ninth rotation elements of the third planetary gear set are respectively a third sun gear, a third planet carrier, and a third ring gear of the third planetary gear set, and
the tenth, eleventh, and twelfth rotation elements of the fourth planetary gear set are respectively a fourth sun gear, a fourth planet carrier, and a fourth ring gear of the fourth planetary gear set.

9. The planetary gear train of claim 6, wherein the first, second, third, and fourth planetary gear sets are disposed in a sequence of the first, second, third, and fourth planetary gear sets from an engine side.

10. The planetary gear train of claim 7, further comprising:
a first clutch configured to selectively connect the first rotation element and the second rotation element;
a second clutch configured to selectively connect the second rotation element and the sixth rotation element;
a third clutch configured to selectively connect the second rotation element and the seventh rotation element;
a fourth clutch configured to selectively connect the third rotation element and the ninth rotation element;
a first brake configured to selectively connect the fourth rotation element and the transmission housing; and
a second brake configured to selectively connect the seventh rotation element and the transmission housing.

\* \* \* \* \*